US009348661B2

(12) United States Patent
Archer et al.

(10) Patent No.: US 9,348,661 B2
(45) Date of Patent: May 24, 2016

(54) ASSIGNING A UNIQUE IDENTIFIER TO A COMMUNICATOR

(75) Inventors: Charles J. Archer, Rochester, MN (US); James E. Carey, Rochester, MN (US); Matthew W. Markland, Rochester, MN (US); Philip J. Sanders, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 12/721,981

(22) Filed: Mar. 11, 2010

(65) Prior Publication Data
US 2011/0225226 A1 Sep. 15, 2011

(51) Int. Cl.
G06F 15/16 (2006.01)
G06F 9/54 (2006.01)

(52) U.S. Cl.
CPC ........................................ *G06F 9/54* (2013.01)

(58) Field of Classification Search
CPC .............................. H04L 67/1097; G06F 9/54
USPC ........................................................ 709/201
See application file for complete search history.

(56) References Cited

U.S. PATENT DOCUMENTS

| | | |
|---|---|---|
| 4,974,149 A | 11/1990 | Valenti |
| 5,257,374 A | 10/1993 | Hammer et al. |
| 5,592,622 A | 1/1997 | Isfeld et al. |
| 5,612,957 A | 3/1997 | Gregerson et al. |
| 5,657,428 A | 8/1997 | Tsuruta et al. |
| 6,092,097 A | 7/2000 | Suzuoka et al. |
| 6,112,304 A | 8/2000 | Clawson |
| 6,157,927 A | 12/2000 | Schaefer et al. |
| 6,185,578 B1 | 2/2001 | Yokote et al. |
| 6,216,262 B1 | 4/2001 | Martin |
| 6,226,792 B1 | 5/2001 | Goiffon et al. |
| 6,233,725 B1 | 5/2001 | Beadle et al. |
| 6,243,863 B1 | 6/2001 | Kothari et al. |
| 6,253,372 B1 | 6/2001 | Komatsu et al. |
| 6,292,935 B1 | 9/2001 | Lueh et al. |
| 6,324,619 B1 | 11/2001 | Raverdy et al. |
| 6,339,840 B1 | 1/2002 | Kothari et al. |

(Continued)

OTHER PUBLICATIONS

U.S. Appl. No. 12/721,910, filed Mar. 11, 2010, Archer et al.

(Continued)

*Primary Examiner* — June Sison
*Assistant Examiner* — Steven Nguyen
(74) *Attorney, Agent, or Firm* — Edward J. Lenart; Grant A. Johnson; Kennedy Lenart Spraggins LLP

(57) ABSTRACT

Creating, by a parent master process of a parent communicator, a child communicator, including configuring the child communicator with a child master process, wherein a communicator includes a collection of one or more processes executing on compute nodes of a distributed computing system; determining, by the parent master process, whether a unique identifier is available to assign to the child communicator; if a unique identifier is available to assign to the child communicator, assigning, by the parent master process, the available unique identifier to the child communicator; and if a unique identifier is not available to assign to the child communicator: retrieving, by the parent master process, an available unique identifier from a master process of another communicator in a tree of communicators and assigning the retrieved unique identifier to the child communicator.

20 Claims, 10 Drawing Sheets

(56) References Cited

U.S. PATENT DOCUMENTS

| | | | |
|---|---|---|---|
| 6,360,358 | B1 | 3/2002 | Elsbree et al. |
| 6,374,403 | B1 | 4/2002 | Darte et al. |
| 6,412,105 | B1 | 6/2002 | Maslennikov et al. |
| 6,457,053 | B1 * | 9/2002 | Satagopan et al. ............ 709/226 |
| 6,553,420 | B1 | 4/2003 | Karger et al. |
| 6,581,104 | B1 | 6/2003 | Bereiter |
| 6,874,141 | B1 | 3/2005 | Swamy et al. |
| 7,225,431 | B2 | 5/2007 | Gschwind et al. |
| 7,243,333 | B2 | 7/2007 | Gchwind et al. |
| 7,644,130 | B2 * | 1/2010 | Magro et al. ................. 709/208 |
| 8,230,408 | B2 | 7/2012 | Eng et al. |
| 8,612,279 | B2 * | 12/2013 | Moon et al. ................. 705/7.26 |
| 2002/0107893 | A1 * | 8/2002 | Ohkouchi et al. ............ 707/514 |
| 2004/0083462 | A1 | 4/2004 | Gschwind et al. |
| 2005/0122946 | A1 * | 6/2005 | Won .............................. 370/338 |
| 2006/0005173 | A1 | 1/2006 | Eng et al. |
| 2006/0059489 | A1 * | 3/2006 | Koyanagi ..................... 718/100 |
| 2007/0198971 | A1 | 8/2007 | Dasu et al. |
| 2007/0240137 | A1 | 10/2007 | Archambault et al. |
| 2007/0242609 | A1 | 10/2007 | Archer et al. |
| 2007/0276833 | A1 * | 11/2007 | Sen et al. ........................... 707/8 |
| 2009/0037377 | A1 * | 2/2009 | Archer et al. ..................... 707/3 |
| 2009/0037598 | A1 * | 2/2009 | Archer et al. ................. 709/238 |
| 2010/0211657 | A1 * | 8/2010 | Kinder et al. ................. 709/221 |
| 2010/0274997 | A1 * | 10/2010 | Archer et al. ................. 712/225 |
| 2011/0225255 | A1 | 9/2011 | Archer et al. |
| 2011/0225297 | A1 | 9/2011 | Archer et al. |
| 2011/0271263 | A1 | 11/2011 | Archer et al. |
| 2013/0060944 | A1 | 3/2013 | Archer et al. |

OTHER PUBLICATIONS

U.S. Appl. No. 12/721,981, filed Mar. 11, 2010, Archer et al.
U.S. Appl. No. 12/722,107, filed Mar. 11, 2010, Archer et al.
U.S. Appl. No. 12/770,353, filed Apr. 29, 2010, Archer et al.
Office Action, U.S. Appl. No. 12/721,981, Mar. 11, 2010.
Office Action, U.S. Appl. No. 12/722,107, Mar. 11, 2010.
Office Action, U.S. Appl. No. 12/770,353, Apr. 29, 2010.
Office Action, U.S. Appl. No. 12/721,910, Jan. 7, 2013.
Final Office Action, U.S. Appl. No. 12/721,981, Feb. 13, 2013.
Advisory Action, U.S. Appl. No. 12/721,981, Apr. 23, 2013.
Final Office Action, U.S. Appl. No. 12/722,107, Apr. 1, 2013.
Office Action, U.S. Appl. No. 12/770,353, Apr. 5, 2013.
Koelbel et al., "Compiling Global Name-Space Parallel Loops for Distributed Execution", IEEE Transactions on Parallel and Distributed Systems, Oct. 1999, pp. 1-12, vol. 2, No. 4, IEEE Xplore Digital Library (online publication), IEEE.org, URL: http://ieeexplore.ieee.org/stamp/stamp.jsp?arnumber=00097901.
Mizrachi et al., "Distributed Compilation Allocation With Look-Ahead Heuristics", Proceedings of the 23rd IEEE Convention of Electrical and Electronics Engineers in Israel, Sep. 2004, pp. 141-144, IEEE Xplore Digital Library (online publication), IEEE.org, URL: http://ieeexplore.ieee.org/stamp/stamp.jsp?tp=&arnumber=1361109.
Gotterbarn et al., "Distributed Compilation Metrics", Proceedings of the 1990 ACM annual conference on Cooperation, Feb. 1990, p. 409, ACM New York, NY, USA.
Notice of Allowance, U.S. Appl. No. 12/770,353, Aug. 22, 2013, pp. 1-18.

* cited by examiner

ASSIGNING A UNIQUE IDENTIFIER TO A COMMUNICATOR

BACKGROUND OF THE INVENTION

1. Field of the Invention

The field of the invention is data processing, or, more specifically, methods, apparatus, and products for assigning a unique identifier to a communicator.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Distributed computing is an area of computer technology that has experienced advances. Distributed computing generally refers to computing with multiple semi-autonomous computer systems that communicate through a data communications network. The semi-autonomous computer systems interact with one another in order to achieve a common goal. A computer program or application that executes in a distributed computing system may be referred to as a distributed program. Distributed computing may also refers to the use of distributed computing systems to solve computational problems. In distributed computing, a problem may be divided into many tasks, each of which may be solved by one of the semi-autonomous computer systems.

Some distributed computing systems are optimized to perform parallel computing. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

Although distributed computing environments are more computationally powerful and efficient in data processing than many non-distributed computing environments, such distributed computing environments still present substantial challenges to the science of automated computing machinery.

SUMMARY OF THE INVENTION

Methods, apparatus, and products for assigning a unique identifier to a communicator in a tree of communicators are disclosed. In embodiments of the present invention, a communicator includes a collection of one or more processes executing on compute nodes of a distributed computing system. Assigning a unique identifier to a communicator includes creating, by a parent master process of a parent communicator, a child communicator, including configuring the child communicator with a child master process; determining, by the parent master process, whether a unique identifier is available to assign to the child communicator; if a unique identifier is available to assign to the child communicator, assigning, by the parent master process, the available unique identifier to the child communicator; and if a unique identifier is not available to assign to the child communicator: retrieving, by the parent master process, an available unique identifier from a master process of another communicator in the tree of communicators and assigning the retrieved unique identifier to the child communicator.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
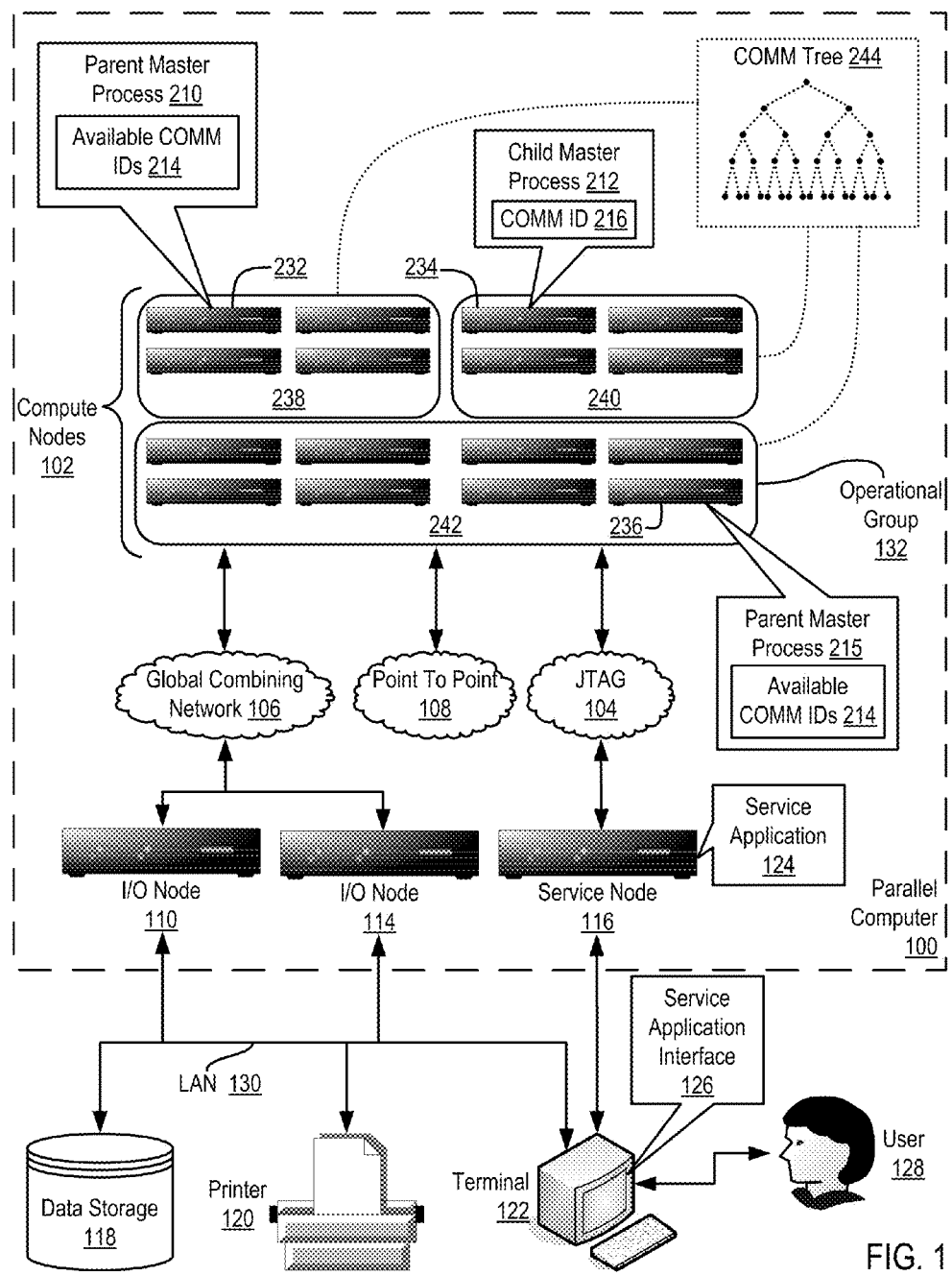
FIG. 1 illustrates an exemplary distributed computing system for assigning a unique identifier to a communicator according to embodiments of the present invention.

Exemplary methods, apparatus, and products for assigning a unique identifier to a communicator in accordance with embodiments of the present invention are described with reference to the accompanying drawings, beginning with FIG. 1. FIG. 1 illustrates an exemplary distributed computing system for assigning a unique identifier to a communicator according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following predefined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The system of FIG. 1 operates generally for assigning a unique identifier to a communicator in a distributed computing system, a parallel computer, according to embodiments of the present invention. A communicator as the term is used in this specification refers to a collection of one or more processes executing on one or more compute nodes of a distributed computing system. Communicators are objects connecting groups of processes in an communications session, such as an MPI session. Within a communicator each contained process has an independent identifier and the contained processes may be arranged in an ordered topology. Communicators enable processes within a group to communicate amongst one another, via intracommunicator operations, and groups of processes to communicate amongst one another via, intercommunicator communications.

In FIGS. 1-6, each compute node is described as executing only one process for clarity of explanation. Because each compute node executes only one process, each compute node in FIGS. 1-6 is synonymous to a single process in a communicator. In the system of FIG. 1, for example, there are three communicators (238, 240, 242). Communicator (238) includes four processes with each process executing on one of four compute nodes. Communicator (240) likewise includes four processes with each process executing on one of four compute nodes. Communicator (242), the operational group (132), includes eight processes with each process executing on one of eight compute nodes. For ease of explanation, this specification may, at times, refer to a communicator including one or more compute nodes rather than processes. Readers of skill in the art will recognize, however, that each compute node need not be limited to executing only one process. With hyperthreading and other multi-thread techniques, for example, one compute node may execute two, four, or any number of processes. In such an embodiment, one compute node may execute two or more processes and each executing process may be a part of a different communicator. In this way, a compute node need not be limited to a single communicator.

The communicators (238, 240, 242) in the example of FIG. 1 are organized into a tree (244) for communication amongst one another. The tree may be configured with a root communicator having one or more children, referred to as leaves of the tree, where each leave (each communicator) has a parent communicator and may have one or more children communicators.

Each communicator operates with a unique identifier. Such an identifier is necessary to carry out intercommunicator communications. In systems of the prior art that operate with multiple communicators each having a unique identifier, there may be a limited number of a identifiers available for newly created communicators. In some prior art systems, a parent communicator assigns a set of unique identifiers to a newly created child communicator upon creation of the child communicator. The newly created child communicator uses one of the set of unique identifiers for itself, and may pass along the remaining identifiers of the set to its own child communicators. In this way, however, some available identifiers may never be assigned. Consider, for example, a root communicator A having available unique identifiers 1-16. Communicator A creates a child B and a child C. Communicator A provides identifiers 1-8 to communicator B and 9-16 to communicator C. Communicator B creates children communicators, passing down identifiers. Communicator B's children communicators in turn create more children communicators and pass down identifiers until all identifiers originally provided to communicator B by the root communicator A are assigned to a communicator. Consider also that communicator C never creates a child communicator and as such never passes down an identifier. In this way, the portion of the tree of communicators beginning with communicator B and below will stop growing, unable to retrieve any additional identifiers, while communicator C has many available identifiers, but is not configured to provide such identifiers to any communicator but its own children.

The system of FIG. 1 operates generally for assigning a unique identifier to a communicator in a tree of communicators in accordance with embodiments of the present invention by creating, by a parent master process (210) of a parent communicator (238), a child communicator (240), including configuring the child communicator with a child master process (212). A master process of a parent communicator may create a child communicator in various ways including splitting the parent communicator. In MPI, for example, an MPI_COMM_SPLIT command will effect a split of a parent communicator into a parent and child communicator. A master process is a process of a communicator dedicated to administering the communicator itself—communications among processes in the communicator and communications among communicators.

The system of FIG. 1 may also determine, by the parent master process (210), whether a unique identifier (214) is available to assign to the child communicator (240). If a unique identifier is available to assign to the child communicator (240), assigning, by the parent master process (210), the available unique identifier (214) to the child communicator (240). The parent master process (210) may assign the unique identifier (214) by registering the identifier with the tree (244) of communicators and sending the unique identifier to the child master process. Registering the identifier with the tree (244) of communicators may be carried out with a global broadcast to all communicators in the tree of communicators. If a unique identifier is not available to assign to the child communicator (240), the system of FIG. 1 may retrieve, by the parent master process (210), an available unique identifier (214) from a master process (215) of another communicator (242) in the tree (244) of communicators and assign the retrieved unique identifier (216) to the child communicator (212). Unlike the parent communicators of the prior art which cannot retrieve an identifier to pass along to a newly created child communicator when the parent communicator has no identifiers available, a parent communicator as modified in accordance with the present invention may retrieve an available unique identifier from another communicator in the tree when the parent communicator has no available unique identifiers to assign.

The arrangement of nodes, networks, and I/O devices making up the exemplary system illustrated in FIG. 1 are for explanation only, not for limitation of the present invention. Data processing systems capable of assigning a unique identifier to a communicator according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of assigning a unique identifier to a communicator according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Assigning a unique identifier to a communicator according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of assigning a unique identifier to a communicator. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
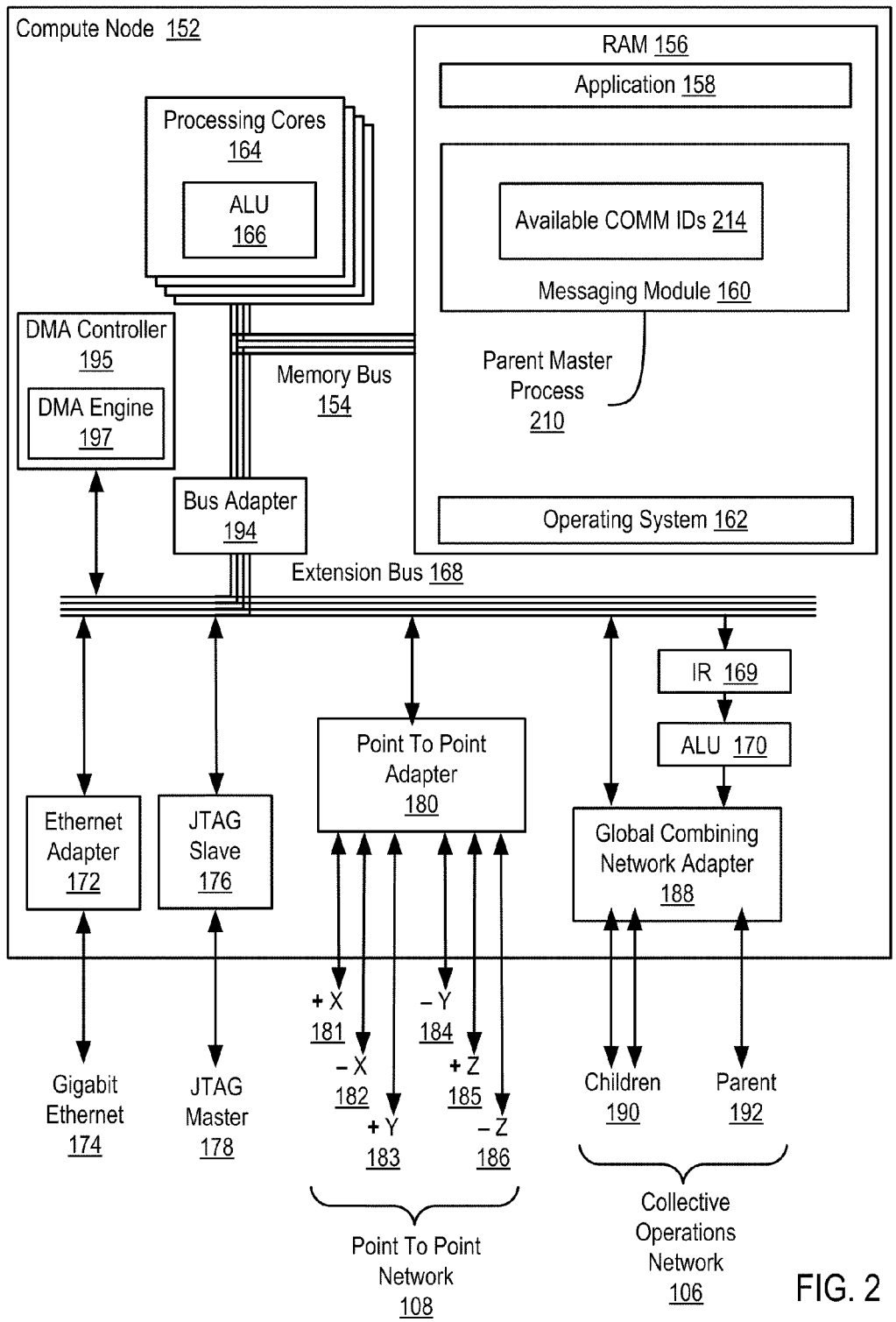
FIG. 2 sets forth a block diagram of an exemplary compute node useful in a parallel computer capable of assigning a unique identifier to a communicator according to embodiments of the present invention.

The messaging module (160) of FIG. 2 has been adapted for assigning a unique identifier to a communicator in accordance with embodiments of the present invention. In the example of FIG. 2, the messaging module (160) is set forth as a parent master process (210) of a parent communicator for purposes of explanation. The parent communicator of which the parent master process (210) is a part is one of a number of other communicators in a tree of communicator. Readers of skill in the art will recognize, however, that processes other than the messaging module (160), such as the application (158) of FIG. 2, may also operate as the parent master process (210) and each such process is well within the scope of the present invention.

The messaging module (160)—the parent master process (210) of the parent communicator—of FIG. 2 operates for assigning a unique identifier to a communicator by creating a child communicator, including configuring the child communicator with a child master process. Such a child process may execute on any compute node (152) in the parallel compute of FIG. 2.

The messaging module (160) may also determine whether a unique identifier (214) is available to assign to the child communicator. If a unique identifier is available to assign to the child communicator, the messaging module (160) may assign the available unique identifier (214) to the child communicator. If a unique identifier is not available to assign to the child communicator, the messaging module (160) may retrieve an available (214) unique identifier from a master process of another communicator in the tree of communicators and assign the retrieved unique identifier to the child communicator.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network.

Examples of communications adapters useful in distributed computing systems that assigning a unique identifier to a communicator according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in assigning a unique identifier to a communicator according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) of FIG. 2 is typically stored in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
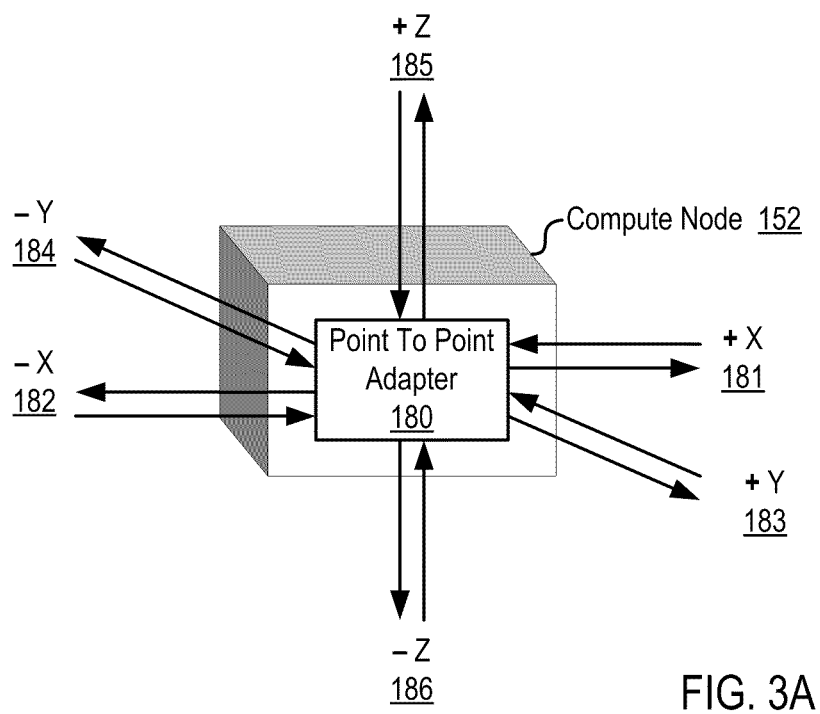
FIG. 3A illustrates an exemplary Point To Point Adapter useful in distributed computing systems capable of assigning a unique identifier to a communicator according to embodiments of the present invention.

For further explanation, FIG. 3A illustrates an exemplary Point To Point Adapter (180) useful in distributed computing systems capable of assigning a unique identifier to a communicator according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
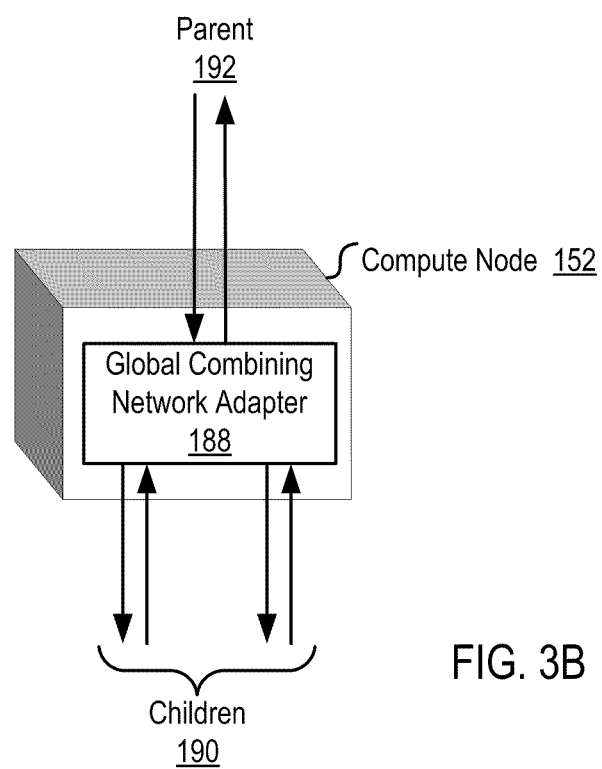
FIG. 3B illustrates an exemplary Global Combining Network Adapter useful in distributed computing systems capable of assigning a unique identifier to a communicator according to embodiments of the present invention.

For further explanation, FIG. 3B illustrates an exemplary Global Combining Network Adapter (188) useful in distributed computing systems capable of controlling access to a resource according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
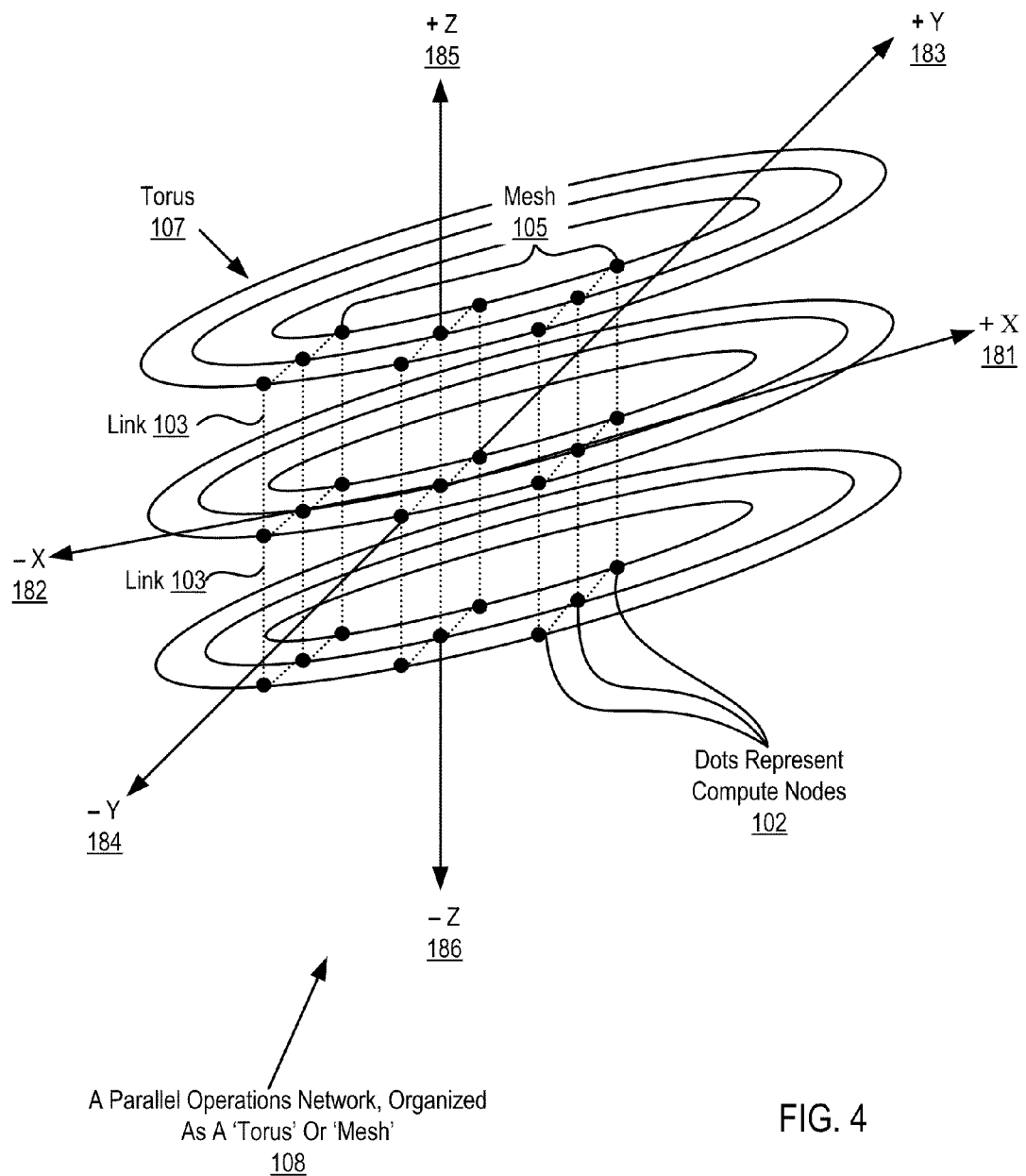
FIG. 4 sets forth a line drawing illustrating an exemplary data communications network optimized for point to point operations useful in distributed computing systems capable of assigning a unique identifier to a communicator in accordance with embodiments of the present invention.

For further explanation, FIG. 4 sets forth a line drawing illustrating an exemplary data communications network (108) optimized for point to point operations useful in distributed computing systems capable of assigning a unique identifier to a communicator in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in assigning a unique identifier to a communicator in accordance with embodiments of the present invention may contain only a few compute nodes or may contain thousands of compute nodes.

Figure 5:
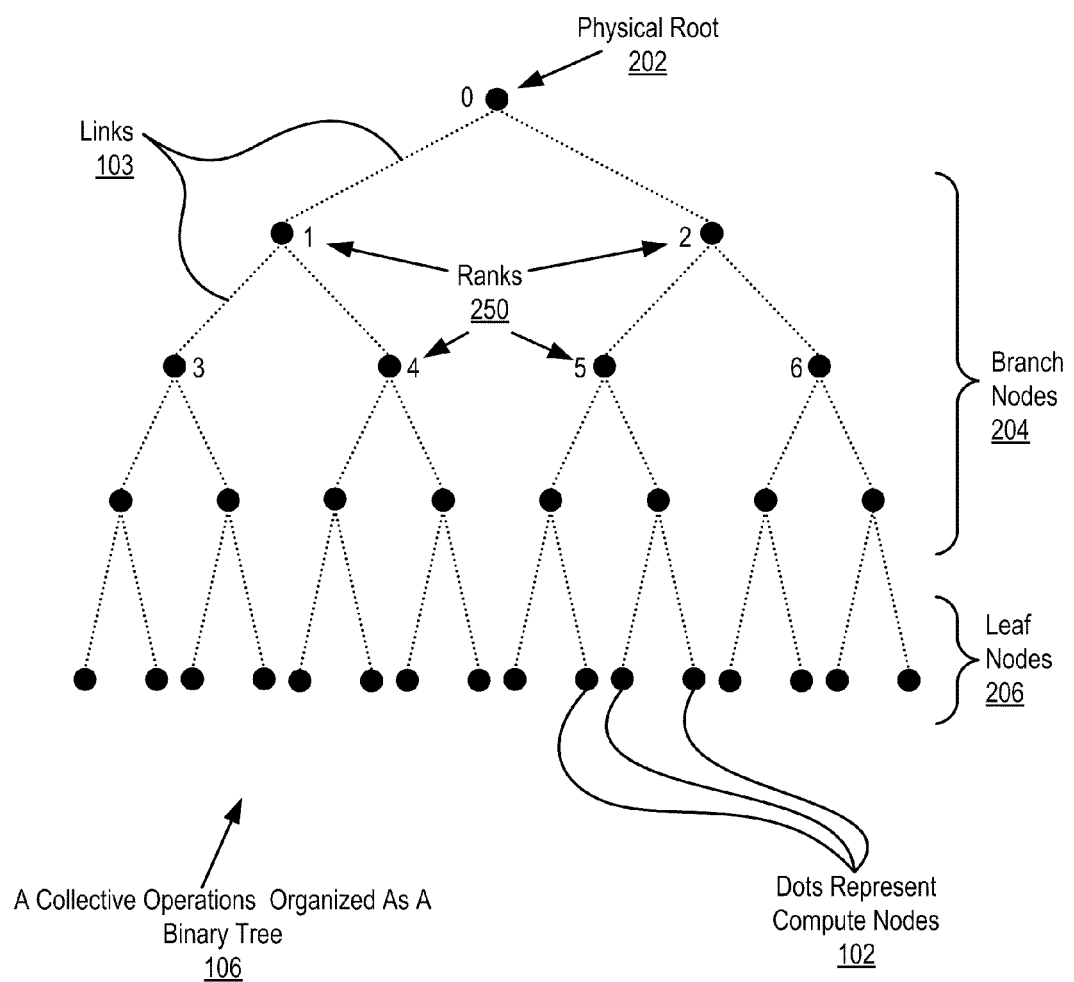
FIG. 5 sets forth a line drawing illustrating an exemplary data communications network optimized for collective operations useful in distributed computing systems capable of assigning a unique identifier to a communicator in accordance with embodiments of the present invention.

For further explanation, FIG. 5 sets forth a line drawing illustrating an exemplary data communications network (106) optimized for collective operations useful in distributed computing systems capable of assigning a unique identifier to a communicator in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in distributed computing systems for assigning a unique identifier to a communicator in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

As described above, each dot set forth in the example tree of FIG. 5 represents a compute node. FIG. 5 may also represent a tree of communicators, where each dot represents a different communicator. In some embodiments, a tree of communicators may be implemented with the tree of a global combining network. That is, the physical root (202) of the tree (106) of FIG. 5 may represent both a compute node and a root communicator in a tree of communicators—one communicator per node with the communicator of each node organized in a tree in exactly the same manner as the nodes themselves. In other embodiments, however, the compute nodes may be organized into a binary tree (106), while the communicators are organized into a separate, different binary tree.

Figure 6:
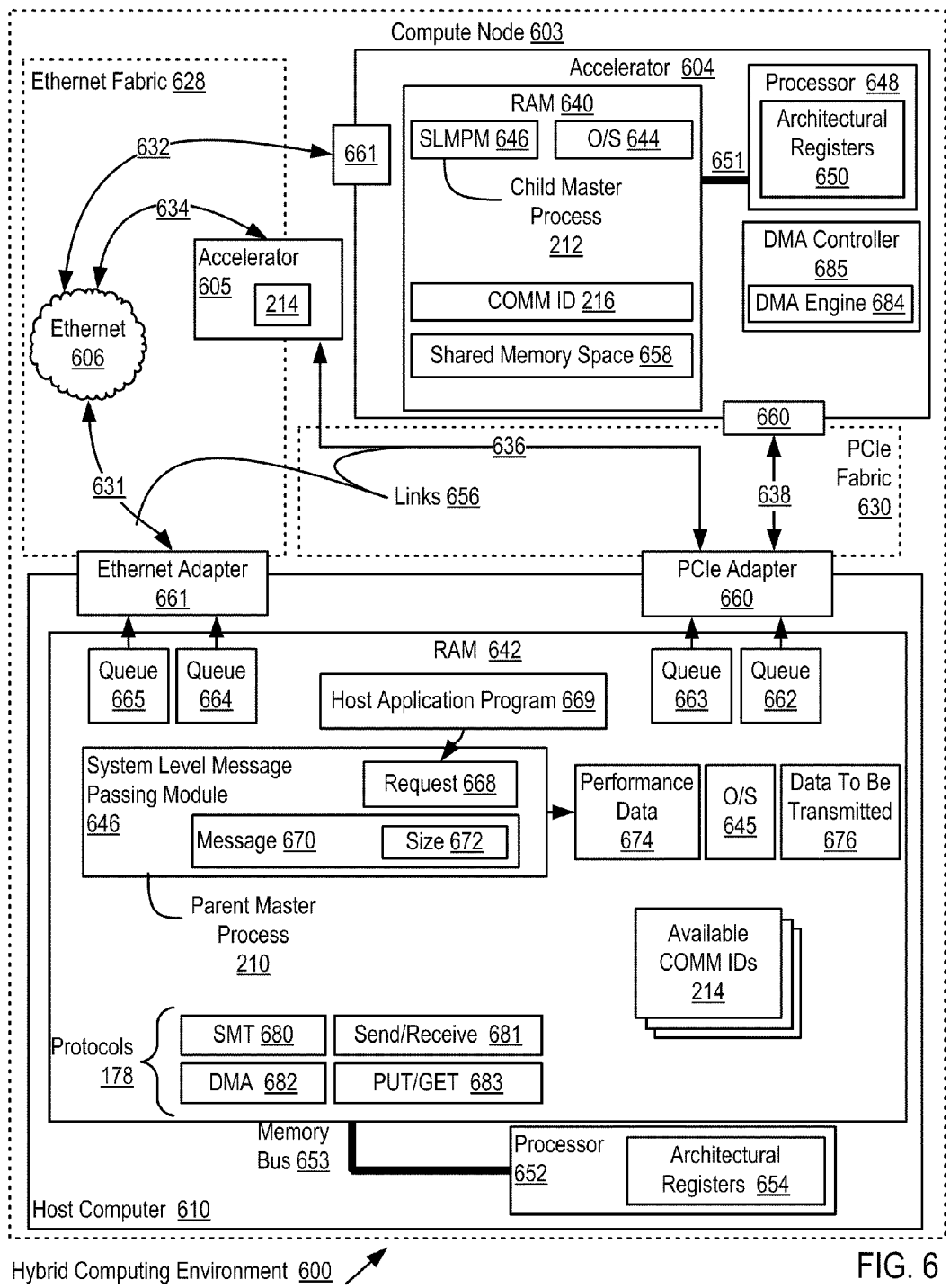
FIG. 6 sets forth a further exemplary distributed computing system for assigning a unique identifier to a communicator according to embodiments of the present invention in which the distributed computing system is implemented as a hybrid computing environment.

For further explanation, FIG. 6 sets forth a further exemplary distributed computing system for assigning a unique identifier to a communicator according to embodiments of the present invention in which the distributed computing system is implemented as a hybrid computing environment. A 'hybrid computing environment,' as the term is used in this specification, is a computing environment in that it includes computer processors operatively coupled to computer memory so as to implement data processing in the form of execution of computer program instructions stored in the memory and executed on the processors. The hybrid computing environment (600) of FIG. 6 includes one compute node (603) that represents a small, separate hybrid computing environment which, when taken with other similar compute nodes, together make up a larger hybrid computing environment.

The example compute node (603) of FIG. 6 may carry out principal user-level computer program execution, accepting administrative services, such as initial program loads and the like, from a service application executing on a service node connected to the compute node (603) through a data communications network. The example compute node may also be coupled for data communications to one or more input/output (I/O) nodes that enable the compute node to gain access to data storage and other I/O functionality. The I/O nodes and service node may be connected to the example compute node (603), to other compute nodes in the larger hybrid computing environment, and to I/O devices, through a local area network ('LAN') implemented using high-speed Ethernet or a data communications fabric of another fabric type as will occur to those of skill in the art. I/O devices useful in a larger hybrid computing environment that includes the compute node (603) may include non-volatile memory for the computing environment in the form of data storage device, an output device for the hybrid computing environment in the form of printer, and a user I/O device in the form of computer terminal that executes a service application interface that provides to a user an interface for configuring compute nodes in the hybrid computing environment and initiating execution by the compute nodes of principal user-level computer program instructions.

The compute node (603) in the example of FIG. 6 is illustrated in an expanded view to aid a more detailed explanation of a hybrid computing environment (600) that may be combined with other hybrid computing environments (other compute nodes) to form a larger hybrid computing environment. The compute node (603) in the example of FIG. 6 includes a host computer (610). A host computer (610) is a 'host' in the sense that it is the host computer that carries out interface functions between a compute node and other components of the hybrid computing environment external to any particular compute node. That is, it is the host computer that executes initial boot procedures, power on self tests, basic I/O functions, accepts user-level program loads from service nodes, and so on.

The host computer (610) in the example of FIG. 6 includes a computer processor (652) operatively coupled to computer memory, Random Access Memory ('RAM') (642), through a high speed memory bus (653). The processor (652) in each host computer (610) has a set of architectural registers (654) that defines the host computer architecture.

The example compute node (603) of FIG. 6 also includes one or more accelerators (604, 605). An accelerator (604) is an 'accelerator' in that each accelerator has an accelerator architecture that is optimized, with respect to the host computer architecture, for speed of execution of a particular class of computing functions. Such accelerated computing functions include, for example, vector processing, floating point operations, and others as will occur to those of skill in the art. Each accelerator (604, 605) in the example of FIG. 6 includes a computer processor (648) operatively coupled to RAM (640) through a high speed memory bus (651). Stored in RAM (640, 642) of the host computer and the accelerators (604, 605) is an operating system (645). Operating systems useful in host computers and accelerators of hybrid computing environments according to embodiments of the present invention include UNIX™, Linux™, Microsoft XP™, Microsoft Vista™, Microsoft NT™, AIX™, IBM's i5/OS™, and others as will occur to those of skill in the art. There is no requirement that the operating system in the host computers should be the same operating system used on the accelerators.

The processor (648) of each accelerator (604, 605) has a set of architectural registers (650) that defines the accelerator architecture. The architectural registers (650) of the processor (648) of each accelerator are different from the architectural registers (654) of the processor (652) in the host computer (610). The architectural registers are registers that are accessible by computer program instructions that execute on each architecture, registers such as an instruction register, a program counter, memory index registers, stack pointers, and the like. With differing architectures, it would be uncommon, although possible, for a host computer and an accelerator to support the same instruction sets. As such, computer program instructions compiled for execution on the processor (648) of an accelerator (604) generally would not be expected to execute natively on the processor (652) of the host computer (610) and vice versa. Moreover, because of the typical differences in hardware architectures between host processors and accelerators, computer program instructions compiled for execution on the processor (652) of a host computer (610) generally would not be expected to execute natively on the processor (648) of an accelerator (604) even if the accelerator supported the instruction set of the host. The accelerator architecture in example of FIG. 6 is optimized, with respect to the host computer architecture, for speed of execution of a particular class of computing functions. That is, for the function or functions for which the accelerator is optimized, execution of those functions will proceed faster on the accelerator than if they were executed on the processor of the host computer.

Examples of hybrid computing environments include a data processing system that in turn includes one or more host computers, each having an x86 processor, and accelerators whose architectural registers implement the PowerPC instruction set. Computer program instructions compiled for execution on the x86 processors in the host computers cannot be executed natively by the PowerPC processors in the accelerators. Readers will recognize in addition that some of the example hybrid computing environments described in this specification are based upon the Los Alamos National Laboratory ('LANL') supercomputer architecture developed in the LANL Roadrunner project (named for the state bird of New Mexico), the supercomputer architecture that famously first generated a 'petaflop,' a million billion floating point operations per second. The LANL supercomputer architecture includes many host computers with dual-core AMD Opteron processors coupled to many accelerators with IBM Cell processors, the Opteron processors and the Cell processors having different architectures.

In the example of FIG. 6, the host computer (610) and the accelerators (604, 605) are adapted to one another for data communications by a system level message passing module ('SLMPM') (646) and two data communications fabrics (628, 630) of at least two different fabric types. A data communications fabric (628, 630) is a configuration of data communications hardware and software that implements a data communications coupling between a host computer and an accelerator. Examples of data communications fabric types include Peripheral Component Interconnect ('PCI'), PCI express ('PCIe'), Ethernet, Infiniband, Fibre Channel, Small Computer System Interface ('SCSI'), External Serial Advanced Technology Attachment ('eSATA'), Universal Serial Bus ('USB'), and so on as will occur to those of skill in the art. In the example of FIG. 6, the host computer (610) and the accelerators (604, 605) are adapted to one another for data communications by a PCIe fabric (630) through PCIe communications adapters (660) and an Ethernet fabric (628) through Ethernet communications adapters (661). The use of PCIe and Ethernet is for explanation, not for limitation of the invention. Readers of skill in the art will immediately recognize that hybrid computing environments according to embodiments of the present invention may include fabrics of other fabric types such as, for example, PCI, Infiniband, Fibre Channel, SCSI, eSATA, USB, and so on.

An SLMPM (646) is a module or library of computer program instructions that exposes an application programming interface ('API') to user-level applications for carrying out message-based data communications between the host computer (610) and the accelerator (604, 605). Examples of message-based data communications libraries that may be improved for use as an SLMPM according to embodiments of the present invention include:

the Message Passing Interface or 'MPI,' an industry standard interface in two versions, first presented at Supercomputing 1994, not sanctioned by any major standards body, the Data Communication and Synchronization interface ('DACS') of the LANL supercomputer, the POSIX Threads library ('Pthreads'), an IEEE standard for distributed, multithreaded processing, the Open Multi-Processing interface ('OpenMP'), an industry-sanctioned specification for parallel programming, and other libraries that will occur to those of skill in the art.

In this example, to support message-based data communications between the host computer (610) and the accelerator (604), both the host computer (610) and the accelerator (604) have an SLMPM (646) so that message-based communications can both originate and be received on both sides of any coupling for data communications.

The SLMPM (646) in this example operates generally for data processing in a hybrid computing environment (600) by monitoring data communications performance for a plurality of data communications modes between the host computer (610) and the accelerators (604, 605), receiving a request (668) to transmit data according to a data communications mode from the host computer to an accelerator, determining whether to transmit the data according to the requested data communications mode, and if the data is not to be transmitted according to the requested data communications mode: selecting another data communications mode and transmitting the data according to the selected data communications mode. In the example of FIG. 6, the monitored performance is illustrated as monitored performance data (674) stored by the SLMPM (646) in RAM (642) of the host computer (610) during operation of the compute node (603).

A data communications mode specifies a data communications fabric type, a data communications link, and a data communications protocol (678). A data communications link (656) is data communications connection between a host computer and an accelerator. In the example of FIG. 6, a link (656) between the host computer (610) and the accelerator (604) may include the PCIe connection (638) or the Ethernet connection (631, 632) through the Ethernet network (606). A link (656) between the host computer (610) and the accelerator (605) in the example of FIG. 6, may include the PCIe connection (636) or the Ethernet connection (631, 634) through the Ethernet network (606). Although only one link for each fabric type is illustrated between the host computer and the accelerator in the example of FIG. 6, readers of skill in the art will immediately recognize that there may any number of links for each fabric type.

A data communications protocol is a set of standard rules for data representation, signaling, authentication and error detection required to send information from a host computer (610) to an accelerator (604). In the example of FIG. 6, the SLMPM (646) may select one of several protocols (678) for data communications between the host computer (610) and the accelerator. Examples of such protocols (678) include shared memory transfers ('SMT') (680) executed with a send and receive operations (681), and direct memory access ('DMA') (682) executed with PUT and GET operations (683).

Shared memory transfer is a data communications protocol for passing data between a host computer and an accelerator into shared memory space (658) allocated for such a purpose such that only one instance of the data resides in memory at any time. Consider the following as an example shared memory transfer between the host computer (610) and the accelerator (604) of FIG. 6. An application (669) requests (668) a transmission of data (676) from the host computer (610) to the accelerator (604) in accordance with the SMT (680) protocol. Such a request (668) may include a memory address allocated for such shared memory. In this example, the shared memory segment (658) is illustrated in a memory location on the accelerator (604), but readers will recognize that shared memory segments may be located on the accelerator (604), on the host computer (610), on both the host computer and the accelerator, or even off the local compute node (603) entirely—so long as the segment is accessible as needed by the host and the accelerator. To carry out a shared memory transfer, the SLMPM (646) on the host computer (610) establishes a data communications connection with the SLMPM (646) executing on the accelerator (604) by a handshaking procedure similar to that in the TCP protocol. The SLMPM (646) then creates a message (670) that includes a header and a payload data and inserts the message into a message transmit queue for a particular link of a particular fabric. In creating the message, the SLMPM inserts, in the header of the message, an identification of the accelerator and an identification of a process executing on the accelerator. The SLMPM also inserts the memory address from the request (668) into the message, either in the header or as part of the payload data. The SLMPM also inserts the data (676) to be transmitted in the message (670) as part of the message payload data. The message is then transmitted by a communications adapter (660, 661) across a fabric (628, 630) to the SLMPM executing on the accelerator (604) where the SLMPM stores the payload data, the data (676) that was transmitted, in shared memory space (658) in RAM (640) in accordance with the memory address in the message.

Direct memory access ('DMA') is a data communications protocol for passing data between a host computer and an accelerator with reduced operational burden on the computer processor (652). A DMA transfer essentially effects a copy of a block of memory from one location to another, typically from a host computer to an accelerator or vice versa. Either or both a host computer and accelerator may include DMA controller and DMA engine, an aggregation of computer hardware and software for direct memory access. Direct memory access includes reading and writing to memory of accelerators and host computers with reduced operational burden on their processors. A DMA engine of an accelerator, for example, may write to or read from memory allocated for DMA purposes, while the processor of the accelerator executes computer program instructions, or otherwise continues to operate. That is, a computer processor may issue an instruction to execute a DMA transfer, but the DMA engine, not the processor, carries out the transfer.

In the example of FIG. 6, only the accelerator (604) includes a DMA controller (685) and DMA engine (684) while the host computer does not. In this embodiment the processor (652) on the host computer initiates a DMA transfer of data from the host to the accelerator by sending a message according to the SMT protocol to the accelerator, instructing the accelerator to perform a remote 'GET' operation. The configuration illustrated in the example of FIG. 6 in which the accelerator (604) is the only device containing a DMA engine is for explanation only, not for limitation. Readers of skill in the art will immediately recognize that in many embodiments, both a host computer and an accelerator may include a DMA controller and DMA engine, while in yet other embodiments only a host computer includes a DMA controller and DMA engine.

To implement a DMA protocol in the hybrid computing environment of FIG. 6 some memory region is allocated for access by the DMA engine. Allocating such memory may be carried out independently from other accelerators or host computers, or may be initiated by and completed in cooperation with another accelerator or host computer. Shared memory regions, allocated according to the SMA protocol, for example, may be memory regions made available to a DMA engine. That is, the initial setup and implementation of DMA data communications in the hybrid computing environment (600) of FIG. 6 may be carried out, at least in part, through shared memory transfers or another out-of-band data communications protocol, out-of-band with respect to a DMA engine. Allocation of memory to implement DMA transfers is relatively high in latency, but once allocated, the DMA protocol provides for high bandwidth data communications that requires less processor utilization than many other data communications protocols.

A direct 'PUT' operation is a mode of transmitting data from a DMA engine on an origin device to a DMA engine on a target device. A direct 'PUT' operation allows data to be transmitted and stored on the target device with little involvement from the target device's processor. To effect minimal involvement from the target device's processor in the direct 'PUT' operation, the origin DMA engine transfers the data to be stored on the target device along with a specific identification of a storage location on the target device. The origin DMA knows the specific storage location on the target device because the specific storage location for storing the data on the target device has been previously provided by the target DMA engine to the origin DMA engine.

A remote 'GET' operation, sometimes denominated an 'rGET,' is another mode of transmitting data from a DMA engine on an origin device to a DMA engine on a target device. A remote 'GET' operation allows data to be transmitted and stored on the target device with little involvement from the origin device's processor. To effect minimal involvement from the origin device's processor in the remote 'GET' operation, the origin DMA engine stores the data in an storage location accessible by the target DMA engine, notifies the target DMA engine, directly or out-of-band through a shared memory transmission, of the storage location and the size of the data ready to be transmitted, and the target DMA engine retrieves the data from storage location.

Monitoring data communications performance for a plurality of data communications modes may include monitoring a number of requests (668) in a message transmit request queue (662-165) for a data communications link (656). In the example of FIG. 6, each message transmit request queue (662-165) is associated with one particular data communications link (656). Each queue (662-165) includes entries for messages (670) that include data (676) to be transmitted by the communications adapters (660, 661) along a data communications link (656) associated with queue.

Monitoring data communications performance for a plurality of data communications modes may also include monitoring utilization of a shared memory space (658). In the example of FIG. 6, shared memory space (658) is allocated in RAM (640) of the accelerator. Utilization is the proportion of the allocated shared memory space to which data has been stored for sending to a target device and has not yet been read or received by the target device, monitored by tracking the writes and reads to and from the allocated shared memory. In the hybrid computing environment (600) of FIG. 6, shared memory space, any memory in fact, is limited. As such, a shared memory space (658) may be filled during execution of an application program (669) such that transmission of data from the host computer (610) to an accelerator may be slowed, or even stopped, due to space limitations in the shared memory space.

In some embodiments of the present invention, the hybrid computing environment (600) of FIG. 6 may be configured to operate as a parallel computing environment in which two or more instances the application program (669) executes on two or more host computers (610) in the parallel computing environment. In such embodiments, monitoring data communications performance across data communications modes may also include aggregating data communications performance information (674) across a plurality of instances of the application program (669) executing on two or more host computers in a parallel computing environment. The aggregated performance information (674) may be used to calculate average communications latencies for data communications modes, average number of requests in data communications links of a particular fabric type, average shared memory utilization among the plurality of host computers and accelerators in the parallel computing environment, and so on as will occur to those of skill in the art. Any combination of such measures may be used by the SLMPM for both determining whether to transmit the data according to requested data communications mode and selecting another data communications mode for transmitting the data if the data is not to be transmitted according to the requested data communications mode.

The SLMPM (646) of FIG. 6 receives, from an application program (669) on the host computer (610), a request (668) to transmit data (676) according to a data communications mode from the host computer (610) to the accelerator (604). Such data (676) may include computer program instructions compiled for execution by the accelerator (604), such as an executable file of an accelerator application program, work piece data for an accelerator application program, files necessary for execution of an accelerator application program, such as libraries, databases, drivers, and the like. Receiving a request (668) to transmit data (676) according to a data communications mode may include receiving a request to transmit data by a specified fabric type, receiving a request to transmit data through a specified data communications link from the host computer to the accelerator, or receiving a request to transmit data from the host computer to the accelerator according to a protocol.

A request (668) to transmit data (676) according to a data communications mode may be implemented as a user-level application function call through an API to the SLMPM (646), a call that expressly specifies a data communications mode according to protocol, fabric type, and link. A request implemented as a function call may specify a protocol according to the operation of the function call itself. A dacs_put( ) function call, for example, may represent a call through an API exposed by an SLMPM implemented as a DACS library to transmit data in the default mode of a DMA 'PUT' operation. Such a call, from the perspective of the calling application and the programmer who wrote the calling application, represents a request to the SLMPM library to transmit data according to the default mode, known to the programmer to be default mode associated with the express API call. The called function, in this example dacs_put( ), may be coded in embodiments with multiple fabric types, protocols, and links, to make its own determination whether to transmit the data according to the requested data communications mode, that is, according to the default mode of the called function. In a further example, a dacs_send( ) instruction may represent a call through an API exposed by an SLMPM implemented as a DACS library to transmit data in the default mode of an SMT 'send' operation, where the called function dacs_send( ) is again coded in embodiments with multiple fabric types, protocols, and links, to make its own determination whether to transmit the data according to the requested mode.

An identification of a particular accelerator in a function call may effectively specify a fabric type. Such a function call may include as a call parameters an identification of a particular accelerator. An identification of a particular accelerator by use of a PCIe ID, for example, effectively specifies a PCI fabric type. In another, similar, example, an identification of a particular accelerator by use of a media access control ('MAC') address of an Ethernet adapter effectively specifies the Ethernet fabric type. Instead of implementing the accelerator ID of the function call from an application executing on the host in such a way as to specify a fabric type, the function call may only include a globally unique identification of the particular accelerator as a parameter of the call, thereby specifying only a link from the host computer to the accelerator, not a fabric type. In this case, the function called may implement a default fabric type for use with a particular protocol. If the function called in the SLMPM is configured with PCIe as a default fabric type for use with the DMA protocol, for example, and the SLMPM receives a request to transmit data to the accelerator (604) according to the DMA protocol, a DMA PUT or DMA remote GET operation, the function called explicitly specifies the default fabric type for DMA, the PCIe fabric type.

In hybrid computing environments in which only one link of each fabric type adapts a single host computer to a single accelerator, the identification of a particular accelerator in a parameter of a function call, may also effectively specify a link. In hybrid computing environments where more than one link of each fabric type adapts a host computer and an accelerator, such as two PCIe links connecting the host computer (610) to the accelerator (604), the SLMPM function called may implement a default link for the accelerator identified in the parameter of the function call for the fabric type specified by the identification of the accelerator.

The SLMPM (646) in the example of FIG. 6 also determines, in dependence upon the monitored performance (674), whether to transmit the data (676) according to the requested data communications mode. Determining whether to transmit the data (676) according to the requested data communications mode may include determining whether to transmit data by a requested fabric type, whether to transmit data through a requested data communications link, or whether to transmit data according to a requested protocol.

In hybrid computing environments according to embodiments of the present invention, where monitoring data communications performance across data communications modes includes monitoring a number of requests in a message transmit request queue (662-165) for a data communications link, determining whether to transmit the data (676) according to the requested data communications mode may be carried out by determining whether the number of requests in the message transmit request queue exceeds a predetermined threshold. In hybrid computing environments according to embodiments of the present invention, where monitoring data communications performance for a plurality of data communications modes includes monitoring utilization of a shared memory space, determining whether to transmit the data (676) according to the requested data communications mode may be carried out by determining whether the utilization of the shared memory space exceeds a predetermined threshold.

If the data is not to be transmitted according to the requested data communications mode, the SLMPM (646) selects, in dependence upon the monitored performance, another data communications mode for transmitting the data and transmits the data (676) according to the selected data communications mode. Selecting another data communications mode for transmitting the data may include selecting, in dependence upon the monitored performance, another data communications fabric type by which to transmit the data, selecting a data communications link through which to transmit the data, and selecting another data communications protocol. Consider as an example, that the requested data communications mode is a DMA transmission using a PUT operation through link (638) of the PCIe fabric (630) to the accelerator (604). If the monitored data performance (674) indicates that the number of requests in transmit message request queue (662) associated with the link (638) exceeds a predetermined threshold, the SLMPM may select another fabric type, the Ethernet fabric (628), and link (631, 632) through which to transmit the data (676). Also consider that the monitored performance (676) indicates that current utilization of the shared memory space (658) is less than a predetermined threshold while the number of outstanding DMA transmissions in the queue (662) exceeds a predetermined threshold. In such a case, the SLMPM (646) may also select another protocol, such as a shared memory transfer, by which to transmit the data (674).

Selecting, by the SLMPM, another data communications mode for transmitting the data (672) may also include selecting a data communications protocol (678) in dependence upon data communications message size (672). Selecting a data communications protocol (678) in dependence upon data communications message size (672) may be carried out by determining whether a size of a message exceeds a predetermined threshold. For larger messages (670), the DMA protocol may be a preferred protocol as processor utilization in making a DMA transfer of a larger message (670) is typically less than the processor utilization in making a shared memory transfer of a message of the same size.

As mentioned above, the SLMPM may also transmit the data according to the selected data communications mode. Transmit the data according to the selected data communications mode may include transmitting the data by the selected data communications fabric type, transmitting the data through the selected data communications link, or transmitting the data according to the selected protocol. The SLMPM (646) may effect a transmission of the data according to the selected data communications mode by instructing, through a device driver, the communications adapter for the data communications fabric type of the selected data communications mode to transmit the message (670) according to a protocol of the selected data communications mode, where the message includes in a message header, an identification of the accelerator, and in the message payload, the data (676) to be transmitted.

The example SLMPM (646) in the hybrid computing environment (600) of FIG. 6 also operates generally for assigning a unique identifier to a communicator. In the example of FIG. 6, the instance of the SLMPM (646) executing on the host computer (610) is depicted as a parent master process (210) of a parent communicator for purposes of explanation, not limitation. The instance of the SLMPM executing on the accelerator (605) is a master process of another communicator. The communicators in the example of FIG. 6 are organized as a tree of communicators.

The SLMPM (646) on the host computer (610) in assigning a unique identifier to a communicator in accordance with embodiments of the present invention may create a child communicator including configuring the child communicator with a child master process (212)—the instance of the SLMPM (646) executing on the accelerator (604). The SLMPM (646) on the host computer (610) may also determining whether a unique identifier (214) is available to assign to the child communicator. If a unique identifier is available to assign to the child communicator, the SLMPM (46) on the host computer assigns the available unique identifier (214) to the child communicator. If a unique identifier is not available to assign to the child communicator, the SLMPM (646) on the host computer (610) retrieves an available unique identifier (214) from a master process of another communicator in the tree of communicators—the SLMPM (646) executing on the accelerator (605), for example—and assigns the retrieved unique identifier (216) to the child communicator.

Figure 7:
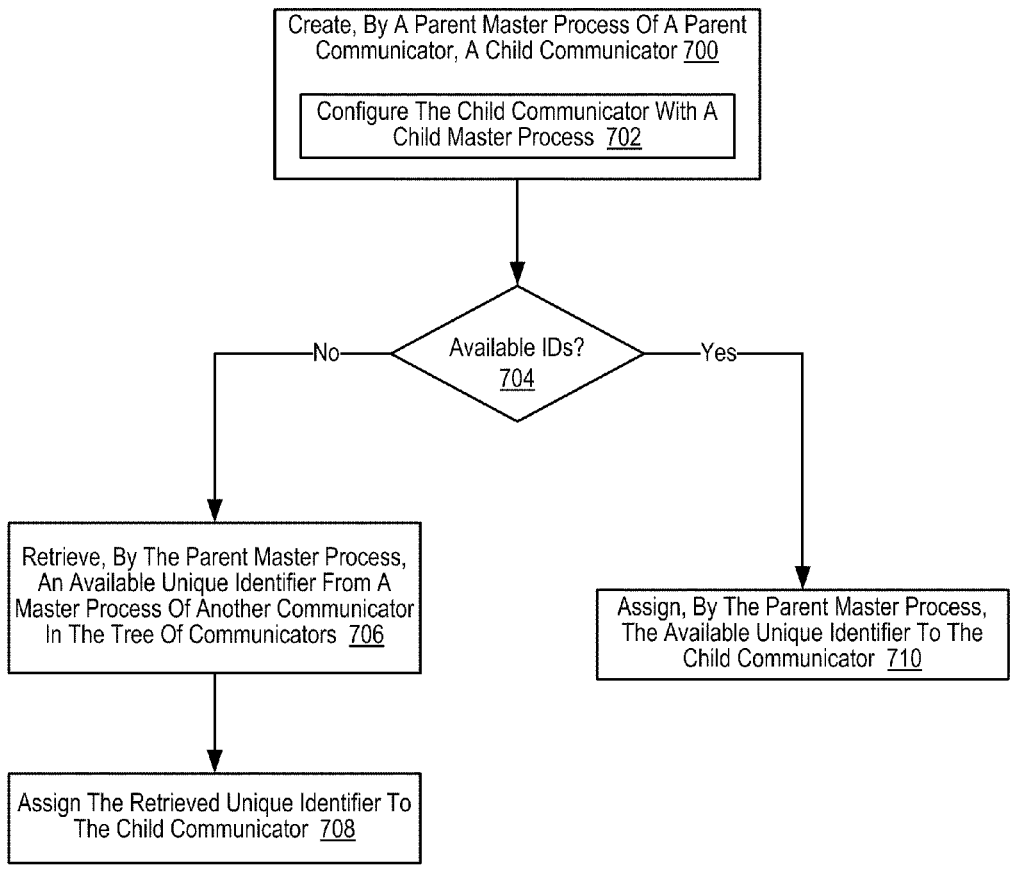
FIG. 7 sets forth an exemplary method of assigning a unique identifier to a communicator according to embodiments of the present invention.

For further explanation, FIG. 7 sets forth an exemplary method of assigning a unique identifier to a communicator according to embodiments of the present invention. The method of FIG. 7 may be carried out in a distributed computing system similar to the example distributed computing systems described above: the example parallel computers of FIGS. 1-5 and the example hybrid computing environment of FIG. 6.

In the method of FIG. 7, a communicator includes a collection of one or more processes executing on compute nodes of a distributed computing system and the communicators are organized into a tree of communicators. The method of FIG. 7 includes creating (700), by a parent master process of a parent communicator, a child communicator. In the method of FIG. 7, creating (700) a child communicator includes configuring (702) the child communicator with a child master process.

The method of FIG. 7 also includes determining (704), by the parent master process, whether a unique identifier is available to assign to the child communicator. If a unique identifier is available to assign to the child communicator the method of FIG. 7 continues by assigning (710), by the parent master process, the available unique identifier to the child communicator. If a unique identifier is not available to assign to the child communicator the method of FIG. 7 continues by retrieving (706), by the parent master process, an available unique identifier from a master process of another communicator in the tree of communicators and assigning (708) the retrieved unique identifier to the child communicator.

Figure 8:
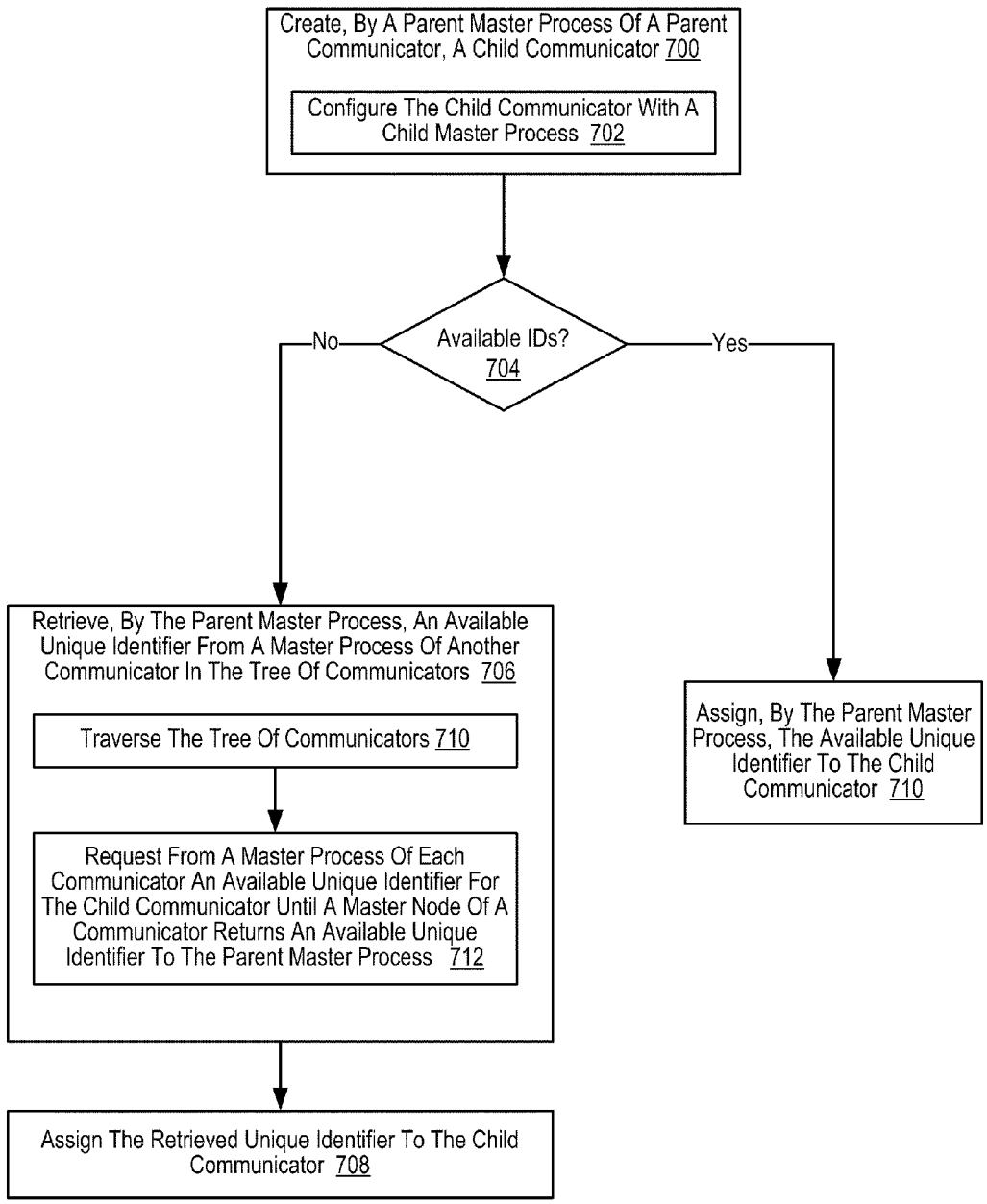
FIG. 8 sets forth a further exemplary method assigning a unique identifier to a communicator according to embodiments of the present invention.

For further explanation, FIG. 8 sets forth a further exemplary method of assigning a unique identifier to a communicator according to embodiments of the present invention. The method of FIG. 8 is similar to the method of FIG. 7 in that the method of FIG. 8 may be carried out in a distributed computing system similar to the example distributed computing systems described above: the example parallel computers of FIGS. 1-5 and the example hybrid computing environment of FIG. 6.

The method of FIG. 8 is also similar to the method of FIG. 7 in that a communicator includes a collection of one or more processes executing on compute nodes of a distributed computing system, the communicators are organized into a tree, and the method includes creating (700) a child communicator; determining (704) whether a unique identifier is available to assign to the child communicator; assigning (710) an available unique identifier to the child communicator; and, if a unique identifier is not available: retrieving (706) an available unique identifier from a master process of another communicator in the tree of communicators and assigning (708) the retrieved unique identifier to the child communicator.

The method of FIG. 8 differs from the method of FIG. 7, however, in that in the method of FIG. 8, retrieving (706) an available unique identifier from a master process of another communicator in the tree of communicators includes traversing (710) the tree of communicators and requesting (712) from a master process of each communicator an available unique identifier for the child communicator until a master node of a communicator returns an available unique identifier to the parent master process.

Figure 9:
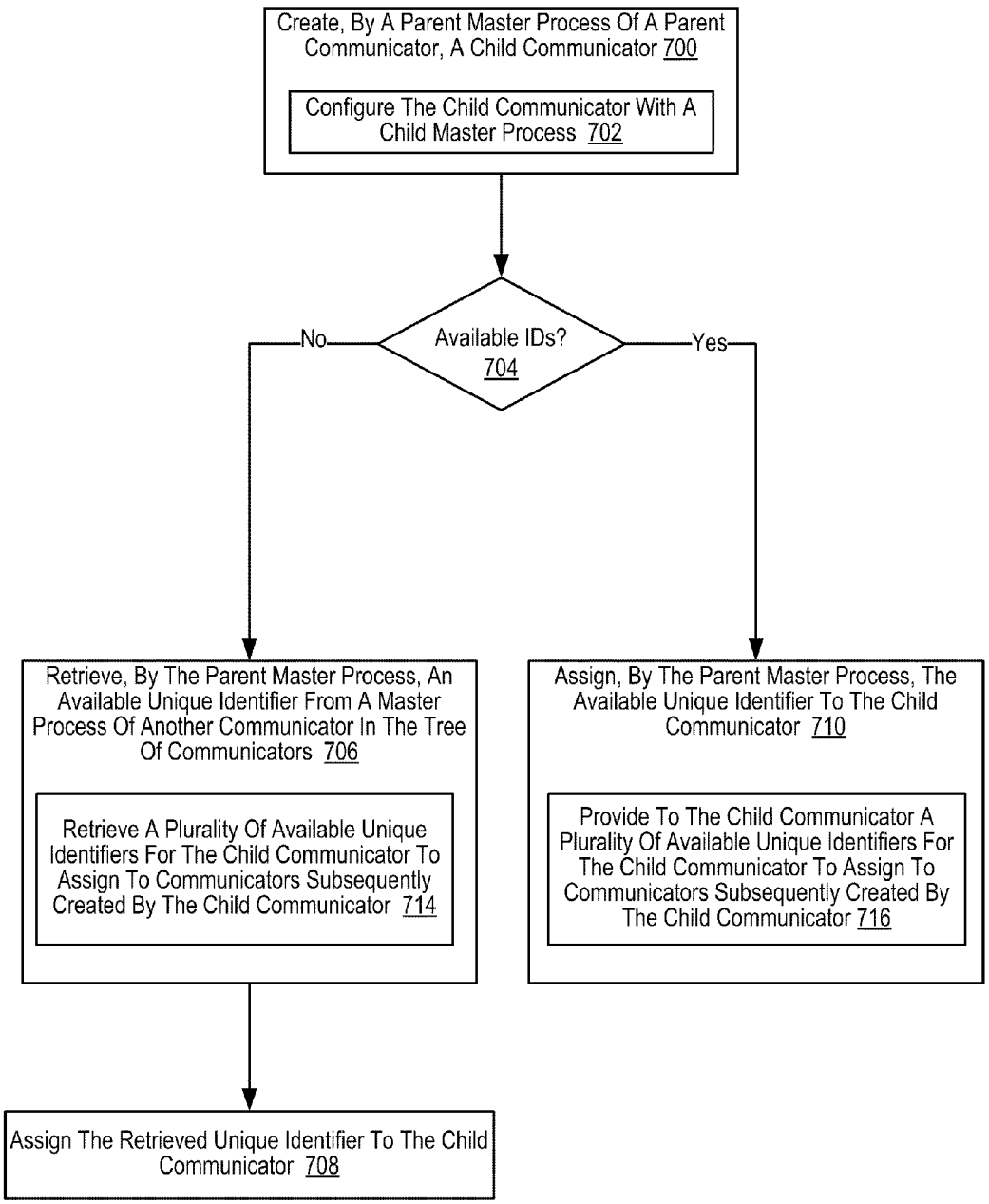
FIG. 9 sets forth a further exemplary method of assigning a unique identifier to a communicator according to embodiments of the present invention.

For further explanation, FIG. 9 sets forth a further exemplary method of assigning a unique identifier to a communicator according to embodiments of the present invention. The method of FIG. 9 is similar to the method of FIG. 7 in that the method of FIG. 9 may be carried out in a distributed computing system similar to the example distributed computing systems described above: the example parallel computers of FIGS. 1-5 and the example hybrid computing environment of FIG. 6.

The method of FIG. 9 is also similar to the method of FIG. 7 in that a communicator includes a collection of one or more processes executing on compute nodes of a distributed computing system, the communicators are organized into a tree, and the method includes creating (700) a child communicator; determining (704) whether a unique identifier is available to assign to the child communicator; assigning (710) an available unique identifier to the child communicator; and, if a unique identifier is not available: retrieving (706) an available unique identifier from a master process of another communicator in the tree of communicators and assigning (708) the retrieved unique identifier to the child communicator.

The method of FIG. 9 differs from the method of FIG. 7, however, in that in the method of FIG. 9 retrieving (706) an available unique identifier is carried out by retrieving (714) a plurality of available unique identifiers for the child communicator to assign to communicators subsequently created by the child communicator. Also in the method of FIG. 9, assigning (710) the unique identifier to the child communicator is carried out by providing (716) to the child communicator a plurality of available unique identifiers for the child communicator to assign to communicators subsequently created by the child communicator. In this way, communications among communicators in the tree of communicators for the purpose of retrieving available identifiers may be reduced.

Figure 10:
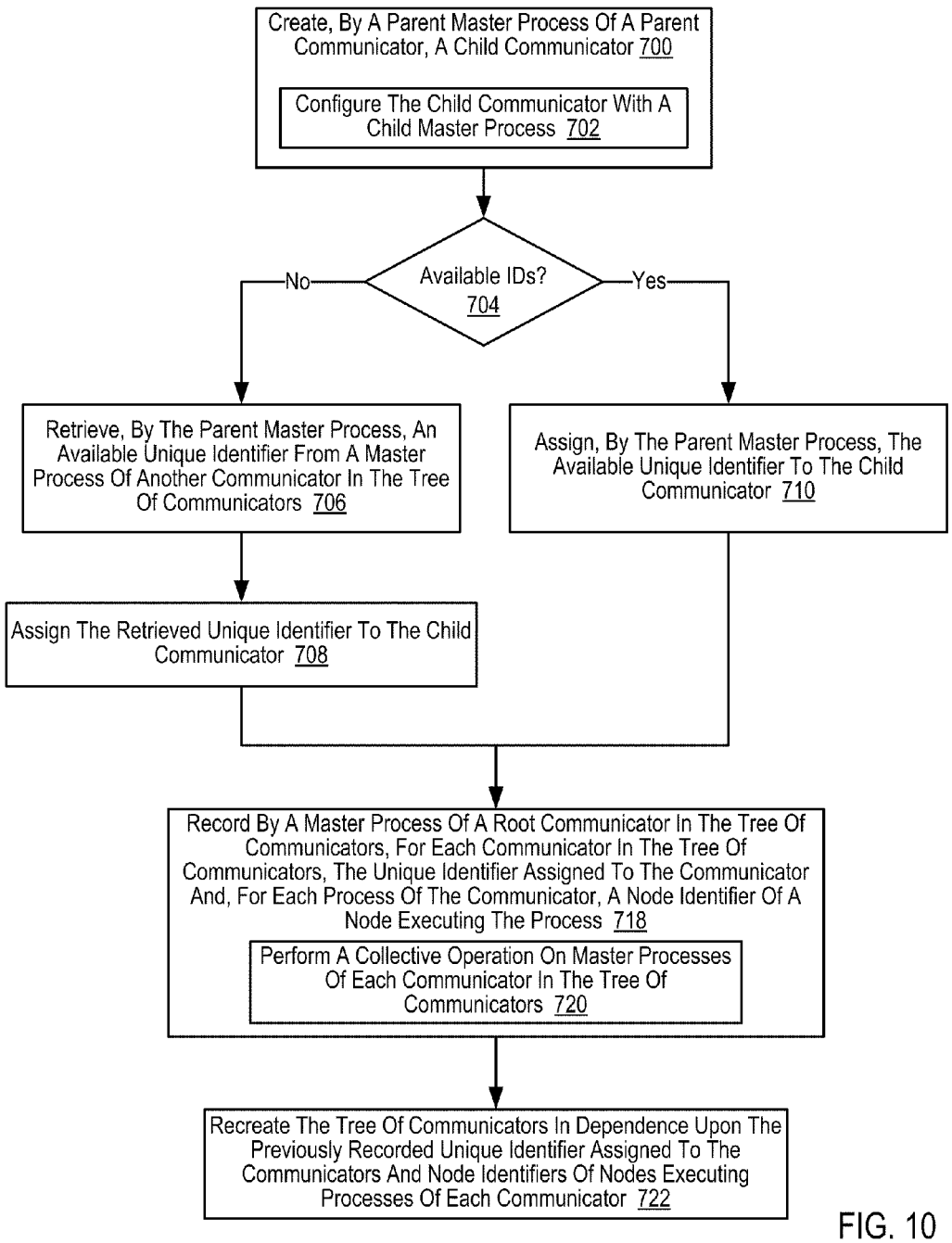
FIG. 10 sets forth a further exemplary method assigning a unique identifier to a communicator according to embodiments of the present invention.

For further explanation, FIG. 10 sets forth a further exemplary method of assigning a unique identifier to a communicator according to embodiments of the present invention. The method of FIG. 10 is similar to the method of FIG. 7 in that the method of FIG. 10 may be carried out in a distributed computing system similar to the example distributed computing systems described above: the example parallel computers of FIGS. 1-5 and the example hybrid computing environment of FIG. 6.

The method of FIG. 10 is also similar to the method of FIG. 7 in that a communicator includes a collection of one or more processes executing on compute nodes of a distributed computing system, the communicators are organized into a tree, and the method includes creating (700) a child communicator; determining (704) whether a unique identifier is available to assign to the child communicator; assigning (710) an available unique identifier to the child communicator; and, if a unique identifier is not available: retrieving (706) an available unique identifier from a master process of another communicator in the tree of communicators and assigning (708) the retrieved unique identifier to the child communicator.

The method of FIG. 10, however, differs from the method of FIG. 7 in that the method of FIG. 10 also includes recording (718) by a master process of a root communicator in the tree of communicators, for each communicator in the tree of communicators, the unique identifier assigned to the communicator and, for each process of the communicator, a node identifier of a node executing the process. In the method of FIG. 5, recording (718) the unique identifiers and node identifiers is carried out by performing a collective operation on master processes of each communicator in the tree of communicators. Such a collective operation may include an 'allgather' operation with results collected in the receive buffer of the master process of the root communicator. Such recording may be carried out for each run of a task or an application. Consider, an application that will be re-run many times with different input data. The processes executing, the nodes on which the processes execute, and the communicators collecting the processes for group communications, may very well be the same in each execution of the application regardless of the input data. Rather than allowing the tree of communicators to be formed during subsequent executions of the application as if the execution were the first, the method of FIG. 10 includes recreating (722) the tree of communicators in dependence upon the previously recorded unique identifier assigned to the communicators and node identifiers of nodes executing processes of each communicator. In this way, after an initial execution of an application or task, the tree of communicators may be recreated in subsequent executions of the application with a reduced amount of communication among the communicators. Rather than traversing the tree requesting available identifiers for a newly created child communicator upon each execution of the application, a parent communicator need only traverse the tree upon the first execution. Thereafter the tree is recreated based upon the records maintained by the root master process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of assigning, in a message passing interface (MPI), a unique identifier to a communicator in a tree of communicators, a communicator comprising a collection of one or more processes executing on compute nodes of a distributed computing system, the method comprising:
creating, by a parent master process of a parent communicator, a child communicator, including configuring the child communicator with a child master process;
determining, by the parent master process, whether a unique identifier is available to assign to the child communicator;
if a unique identifier is available to assign to the child communicator, assigning, by the parent master process, the available unique identifier to the child communicator; and
if a unique identifier is not available to assign to the child communicator:
retrieving, by the parent master process, an available unique identifier from a master process of another communicator in the tree of communicators and assigning the retrieved unique identifier to the child communicator, wherein retrieving an available unique identifier further comprises:
traversing the tree of communicators and requesting, from a master process of each communicator, an available unique identifier for the child communicator until a master node of a communicator returns an available unique identifier to the parent master process, including:
determining that a grandparent master process of a grandparent communicator does not have the available unique identifier; and
retrieving the available unique identifier for the child communicator from the master process of another communicator in the tree of communicators;
wherein after assignment of the retrieved unique identifier to the child communicator, the child communicator remains a child of the parent communicator, and
wherein each communicator is an object connecting groups of processes in a communications session such that the groups of processes are able to communicate amongst one another via intercommunicator communications.

2. The method of claim 1 wherein retrieving an available unique identifier further comprises retrieving a plurality of available unique identifiers for the child communicator to assign to communicators subsequently created by the child communicator.

3. The method of claim 1 wherein assigning the unique identifier to the child communicator further comprises providing to the child communicator a plurality of available unique identifiers for the child communicator to assign to communicators subsequently created by the child communicator.

4. The method of claim 1 further comprising recording by a master process of a root communicator in the tree of communicators, for each communicator in the tree of communicators, the unique identifier assigned to the communicator and, for each process of the communicator, a node identifier of a node executing the process.

5. The method of claim 4 wherein recording for each communicator, the unique identifier assigned to the communicator and, for each process of the communicator, a node identifier of a node executing the process further comprises performing a collective operation on master processes of each communicator in the tree of communicators.

6. The method of claim 4 further comprising recreating the tree of communicators in dependence upon the previously recorded unique identifier assigned to the communicators and node identifiers of nodes executing processes of each communicator.

7. The method of claim 1, wherein the distributed computing system further comprises a parallel computer that includes:
a plurality of compute nodes;

a first data communications network coupling the compute nodes for data communications and optimized for point to point data communications; and a second data communications network that includes data communications links coupling the compute nodes so as to organize the compute nodes as a tree, each compute node having a separate arithmetic logic unit ('ALU') dedicated to parallel operations.

8. The method of claim 1, wherein the distributed computing system further comprises a hybrid computing environment, the hybrid computing environment comprising:

a host computer having a host computer architecture; and an accelerator having an accelerator architecture, the accelerator architecture optimized, with respect to the host computer architecture, for speed of execution of a particular class of computing functions, the host computer and the accelerator adapted to one another for data communications by a system level message passing module.

9. An apparatus for assigning, in a message passing interface (MPI), a unique identifier to a communicator in a tree of communicators, a communicator comprising a collection of one or more processes executing on compute nodes of a distributed computing system, the apparatus comprising a computer processor and a computer memory operatively coupled to the computer processor, the computer processor executing computing instructions stored in the computer memory to perform the steps of:

creating, by a parent master process of a parent communicator, a child communicator, including configuring the child communicator with a child master process;

determining, by the parent master process, whether a unique identifier is available to assign to the child communicator;

if a unique identifier is available to assign to the child communicator, assigning, by the parent master process, the available unique identifier to the child communicator; and if a unique identifier is not available to assign to the child communicator:

retrieving, by the parent master process, an available unique identifier from a master process of another communicator in the tree of communicators and assigning the retrieved unique identifier to the child communicator, wherein retrieving an available unique identifier further comprises:

traversing the tree of communicators and requesting, from a master process of each communicator, an available unique identifier for the child communicator until a master node of a communicator returns an available unique identifier to the parent master process, including:

determining that a grandparent master process of a grandparent communicator does not have the available unique identifier; and retrieving the available unique identifier for the child communicator from the master process of another communicator in the tree of communicators;

wherein after assignment of the retrieved unique identifier to the child communicator, the child communicator remains a child of the parent communicator, and wherein each communicator is an object connecting groups of processes in a communications session such that the groups of processes are able to communicate amongst one another via intercommunicator communications.

10. The apparatus of claim 9 wherein retrieving an available unique identifier further comprises retrieving a plurality of available unique identifiers for the child communicator to assign to communicators subsequently created by the child communicator.

11. The apparatus of claim 9 wherein assigning the unique identifier to the child communicator further comprises providing to the child communicator a plurality of available unique identifiers for the child communicator to assign to communicators subsequently created by the child communicator.

12. The apparatus of claim 9 further comprising computer program instructions capable of recording by a master process of a root communicator in the tree of communicators, for each communicator in the tree of communicators, the unique identifier assigned to the communicator and, for each process of the communicator, a node identifier of a node executing the process.

13. The apparatus of claim 12 wherein recording for each communicator, the unique identifier assigned to the communicator and, for each process of the communicator, a node identifier of a node executing the process further comprises performing a collective operation on master processes of each communicator in the tree of communicators.

14. The apparatus of claim 12 further comprising computer program instructions capable of recreating the tree of communicators in dependence upon the previously recorded unique identifier assigned to the communicators and node identifiers of nodes executing processes of each communicator.

15. A computer program product for assigning, in a message passing interface (MPI), a unique identifier to a communicator in a tree of communicators, a communicator comprising a collection of one or more processes executing on compute nodes of a distributed computing system, the computer program product disposed in a computer readable storage medium, wherein the computer readable storage medium is not a signal, the computer program product comprising computer program instructions to perform the steps of:

creating, by a parent master process of a parent communicator, a child communicator, including configuring the child communicator with a child master process;

determining, by the parent master process, whether a unique identifier is available to assign to the child communicator;

if a unique identifier is available to assign to the child communicator, assigning, by the parent master process, the available unique identifier to the child communicator; and if a unique identifier is not available to assign to the child communicator:

retrieving, by the parent master process, an available unique identifier from a master process of another communicator in the tree of communicators and assigning the retrieved unique identifier to the child communicator, wherein retrieving an available unique identifier further comprises:

traversing the tree of communicators and requesting, from a master process of each communicator, an available unique identifier for the child communicator until a master node of a communicator returns an available unique identifier to the parent master process, including:

determining that a grandparent master process of a grandparent communicator does not have the available unique identifier; and retrieving the available unique identifier for the child communicator from the master process of another communicator in the tree of communicators;

wherein after assignment of the retrieved unique identifier to the child communicator, the child communicator remains a child of the parent communicator, and wherein each communicator is an object connecting groups of processes in a communications session such that the groups of processes are able to communicate amongst one another via intercommunicator communications.

16. The computer program product of claim 15 wherein retrieving an available unique identifier further comprises retrieving a plurality of available unique identifiers for the child communicator to assign to communicators subsequently created by the child communicator.

17. The computer program product of claim 15 wherein assigning the unique identifier to the child communicator further comprises providing to the child communicator a plurality of available unique identifiers for the child communicator to assign to communicators subsequently created by the child communicator.

18. The computer program product of claim 15 further comprising computer program instructions capable of recording by a master process of a root communicator in the tree of communicators, for each communicator in the tree of communicators, the unique identifier assigned to the communicator and, for each process of the communicator, a node identifier of a node executing the process.

19. The computer program product of claim 18 wherein recording for each communicator, the unique identifier assigned to the communicator and, for each process of the communicator, a node identifier of a node executing the process further comprises performing a collective operation on master processes of each communicator in the tree of communicators.

20. The computer program product of claim 18 further comprising computer program instructions capable of recreating the tree of communicators in dependence upon the previously recorded unique identifier assigned to the communicators and node identifiers of nodes executing processes of each communicator.

* * * * *